HERBERT ZIEBOLZ
INVENTOR.

BY

ATTORNEYS

Oct. 10, 1961    H. ZIEBOLZ    3,003,512
FLUID REGULATOR SYSTEM
Filed Jan. 28, 1960    3 Sheets-Sheet 2
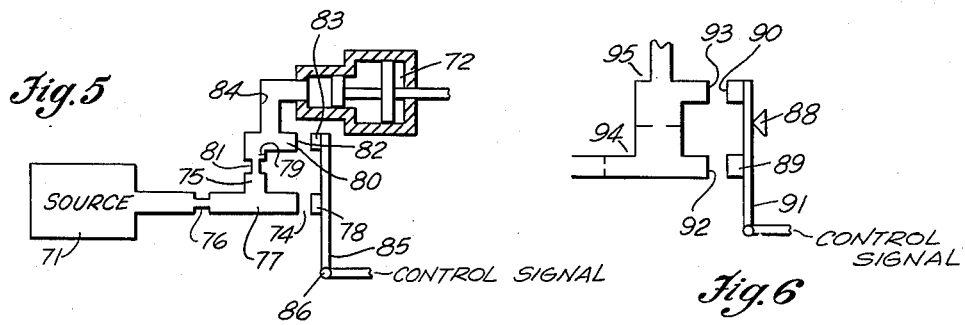
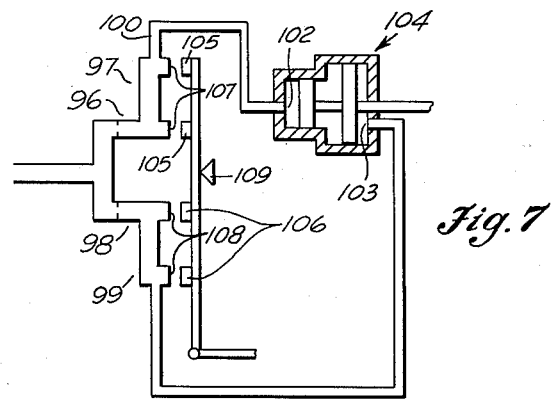
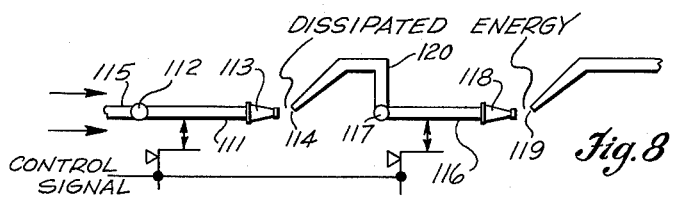
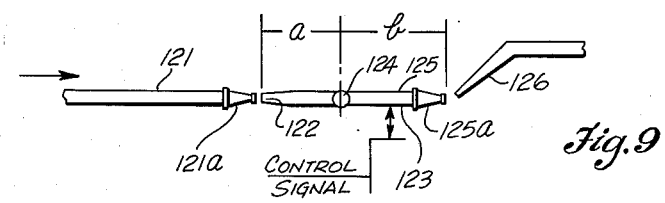
HERBERT ZIEBOLZ
INVENTOR.
BY Andrew J. Bain
George B. Oujvolt
ATTORNEYS

United States Patent Office 3,003,512
Patented Oct. 10, 1961

3,003,512
FLUID REGULATOR SYSTEM
Herbert Ziebolz, New York, N.Y., assignor to General Precision, Inc., Little Falls, N.J., a corporation of Delaware
Filed Jan. 28, 1960, Ser. No. 5,270
9 Claims. (Cl. 137—82)

This invention relates to regulation of fluid transmission of operating energy to a utilization device, as by control of pressure and or volume flow rate of flowing fluid. Such systems typically are used for fluid powered relay purposes. The invention is particularly adapted to use in dynamic systems wherein the energy transmitting fluid flows continuously between high and low pressure regions with dissipation and recovery of inversely variable percentages of the fluid transmitted energy under control of a regulator. The regulator acts to vary an energy content determining condition of the fluid, one or both of pressure and/or volume flow rate, that is imposed on the utilization device or power unit.

There are three well known general types of regulators that have been commonly used for such purposes. One of these is the variable throttle which variably restricts the effective cross sectional area of the flow path to produce in a system wherein fluid is supplied at a constant volume flow rate, a variable differential between the supply pressure and the pressure imposed on the utilization device, and variable drops in both flow rate and pressure in a system wherein the fluid is supplied at constant pressure. A second is the variable discharge orifice, typified by movable vane or baffle regulators, wherein variation of the effective area of an orifice for discharge from a controlled pressure-developing chamber to an exhaust region results in variation in the recovered back pressure that is developed in the chamber by fluid supplied at constant rate and pressure through a flow-restricting orifice. The third type is the jet type wherein a high velocity stream of fluid is directed toward a receiver port for development of a recovered pressure in the latter, a variable portion of the stream being diverted from the port to vary the recovered pressure. The most usual form of the last regulator type takes the form of a jet pipe that is pivoted to swing relative to a pair of receiver ports, for inverse variation of the pressures developed in them respectively by inverse variation of the degrees of registration of the jet pipe discharge orifice with the different ports. In the first or throttle valve type, a percentage of the energy delivered to the system is dissipated by resistance to fluid flow through the variably throttle-restricted orifice. In the second and third types, energy is dissipated by direct discharge to exhaust of variable portions of the energy transmitting fluid streams.

In general these conventional regulators have definite types of response characteristics of degree of variation in magnitude of the controlled fluid condition, volume flow rate and/or pressure, in response to uniform increments of movement of the movable control member. For example, typical response characteristics of such regulators include ranges wherein response is quite linear, extended from neutral conditions of minimum deflection of the control members from zero positions, such ranges terminating in well defined knees and the response characteristics also including maximum response ranges of response that progressively decreases with equal increments of increasing control member deflection. These characteristics in many situations are not the most desirable for relay control purposes. For example, the type described tends to result in overcontrol and hunting in operating ranges wherein small degrees of response are required, or as an alternative require an undesirable limitation in response speed in the portions of the operating ranges requiring larger degrees of response. Additionally, in certain situations it is highly desirable that relay systems be arranged for response that is a preselected non-linear function of control member deflection. Efforts to accomplish preselected non-linear response by means of "characterization", that is, contouring relatively movable variable flow path area-defining members is correspondence to the required function have not been successful generally due to impossibility of accurately contouring the comparatively short, relatively movable edges defining the small control orifices that are normally found in such control systems.

The present invention relates to systems for regulating the energy recovery-determining condition of the fluid, which volume flow rate and/or pressure, regulated condition is recovered and utilized by a fluid powered motor device, and the condition control serving as a means for selecting speed and/or force of operation of that device. It is based on the fundamental concept of employing in a single system a plurality of regulators, which may be of one or more of the conventional types mentioned and which are so interrelated in the system that each performs a true modulation upon the gain of each other. The term "gain" is used in its conventional sense as meaning the characteristic response in degree of variation in the controlled energy recovery-determining condition to the degree of deflection of the control member of a regulator.

In the prior art there have been instances wherein dual regulators have been employed, specifically in the use of a pair of variable orifices, or throttles, in series in a flow line, with recovery of pressure from the interior of the line between the orifices; and push pull arrangements of parallel movable vane back pressure-developing regulators with the vanes mechanically coupled for inverse variation of the pressures that they respectively develop, and recovery of differential between those pressures. Such arrangements operate to increase the gain of the assembly as compared to a single regulator, that is, the slope of the curve graphically representing the response of such a multiple regulator assembly differs from that representing response of a single regulator, but in such assemblies one regulator does not perform a true modulation of the gain of the other, that is, the nature or shape of the response curve of such a multiple regulator assembly closely resembles one representing response of the individual component regulators, and linear response occurs in a range corresponding to linear response ranges of the individual regulators. One of multiple regulators connected in accordance with the invention does modulate the gain of one or more other regulators, and provides a mean for selecting either a completely non-linear response or a means for selecting a range of linear response differing from those of the component regulators.

Parameters that vary materially affect the response characteristic of a regulator that controls volume flow rate and/or pressure of a flowing fluid are volume flow rate and pressure of the flowing fluid that is supplied to the fluid input of the regulator and/or of the fluid as it is exhausted from the regulator. The principal effect of variation of these parameters is lengthening or shortening of the range wherein the response of the regulator is linearly proportional to degree of movement of its control member. These parameters, at least one of which is fixed in a conventional system, are in turn determined by system parameters: cross sectional areas, number and location relative to the regulator of restrictions in the fluid flow path; number, effective areas and locations relative to the regulator, of exhaust openings, including leaks; and pressure and volume rate of fluid supply to the system. Normally the first two and at least one of the last of these system parameters are fixed, so that in the conventional regulator system the response characteristic of the system is determined by the fixed parameters and the response characteristic of the regulator. The present invention is based on the concept of arranging the multiple regulators so that at least one of the indicated response-affecting parameters of fluid supply to or exhaust from a first regulator, volume flow rate and/or pressure, is adjusted by one or more additional regulators in a preselected functional relation to the adjustment of the movable control member of that first regulator. In one of its aspects, the invention may be regarded as involving the arrangement of one or more auxiliary regulators to adjust one or more of the conventionally fixed system parameters that heretofore have, together with the response characteristic of the particular regulator used, determined flow and/or pressure of supply to and exhaust from a regulator and thereby determined the system response characteristic. The indicated preselected functional relationship is imposed by interconnecting the movable control members of the various regulators for properly proportioning the corresponding movements of their respective control members, with respect to the individual response characteristics of the different regulators, the manner in which the variation of the volume rate and/or pressure of supply or exhaust affects the response of the regulator supplied, and the required response characteristic of the system.

A primary object of the invention is provision in a fluid delivery control system of a novel type of arrangement of multiple signal responsive volume flow rate and/or delivered pressure regulators, interrelated by common signal control, whereby, and also by their relative arrangement in the system, each regulator modulates the gain of each other regulator to provide a preselected system response characteristic.

Another object is the provision of a type of system arrangement presenting great flexibility in the general types of characteristics that can be imparted to such systems by selection among a wide variety of different general arrangements of inter-relationships among multiple regulators, as well as by selection of the types of individual regulators on the basis of the differing response characteristics of different kinds of regulators.

Still another object is the provision of such a type of system arrangement that can be employed for regulation of any of the controlled and utilized conditions usually required of such systems, as volume rate of fluid delivery, recovered pressure, or differential between two recovered pressures.

In general, these objects are accomplished by so arranging the regulator, in relation to a main path of fluid flow arranged for transmission of energy from a high energy source to a utilization device delivery coupling, that each such regulator effects a variable differential between energy content levels of fluid flowing in different sections of the flow path, and at least one such regulator controls a branch or auxiliary path between the main path and a region of pressure which may be either a source of pressurized fluid supply or exhaust. One or more of the regulators may be arranged directly in the main path to effect an energy level differential by throttling action whereby energy is dissipated by resistance to fluid flow. By this general type of arrangement the setting of each regulator effects a supply or exhaust pressure or volume rate parameter that affects the response characteristic of each other regulator, and thereby a true intermodulation among the gains of the different regulators is effected. As indicated, repeatability and establishment of a general system response characteristic are accomplished by common proportional positioning control of the movable control member of the different members of the different regulators.

FIGS. 5 to 9, inclusive, are schematic diagrams of various multiple regulator assemblies arranged according to the invention.

Figure 1:
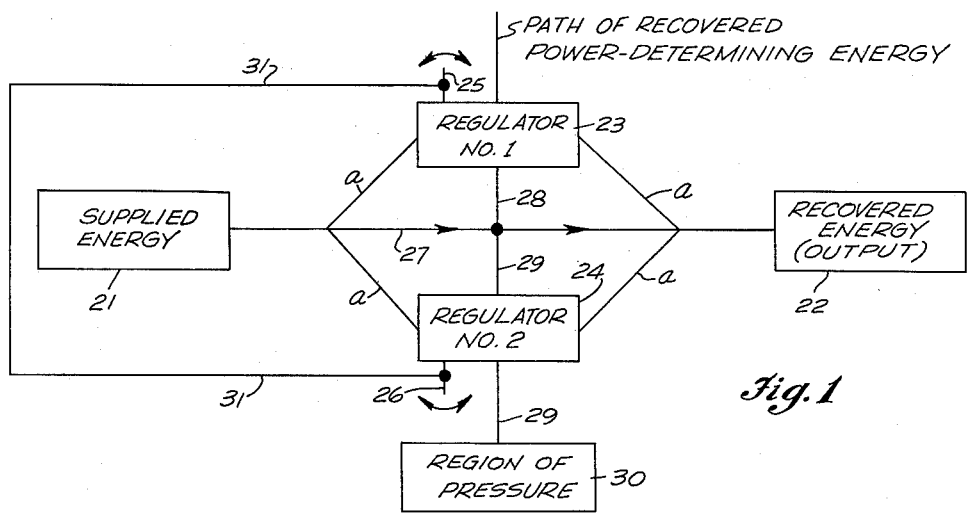
FIG. 1 is a highly schematic block diagram illustrating the basic principle of the invention.

Referring first to FIG. 1, a system is arranged in accordance with the invention to regulate the recovered percentage of the total energy that is delivered to the system by a source of supply 21 of fluid under pressure. The energy for recovery is available at an output 22, the regulation of its magnitude being accomplished by establishing a variable differential between the energy contents of the fluid delivered by the source 21 and of the fluid that is present at the output 22. In accordance with the invention this differential is affected by multiple regulators, shown as two regulators 23, 24, which in accordance with the invention, are so related to each other, and to the flow path from source 21 to output 22, that the characteristic of response in magnitude of variation in the differential to degree of deflection from a zero position of the control member 25 of one regulator, 23, is affected by the degree of deflection from a zero position of the control member 26 of the other regulator. As will appear, each regulator of a system arranged according to the invention has at least an inlet coupling for connection to an enclosed flow path section wherein fluid is at a higher pressure, and an outlet coupling for connection to a second flow path section wherein the fluid is at a lower pressure, a controlled fluid condition coupling which may be one or the other of the inlet or outlet couplings or a third coupling, and a control member that is movable to vary the magnitude of a differential between the energy contents of fluid flowing to and from its inlet and outlet couplings, or, more specifically, to produce a differential or drop in at least one of the fluid conditions, pressure and/or volume flow rate. As will also appear, in certain arrangements and under different conditions, reversal may be made between the inlet and outlet characters of the couplings of at least one of the regulators, that is, direction of flow through that regulator, or through a flow path section with which one of its couplings is connected, may be reversed.

In FIG. 1, the dotted lines $a$ indicate interrelationships between the various components 21, 22, 23 and 24 of the system rather than actually representing paths of fluid flow through the system. Each regulator 23, 24 is of a type, which may be conventional as will appear, that produces a differential in the energy content of fluid that is present in and flowing through different sections of a flow path that extends from source 21 to outlet 22. These energy contents depend on the fluid conditions, pressure and/or volume flow rate, and the differentials are effected either by dissipating a portion of the energy of the fluid that flows through the upstream one of those flow path sections, which may be accomplished by throttling or by discharge of a portion of the fluid to an exhaust region, or by adding additional energy to the fluid delivered to the downstream one of the flow path sections, which may be accomplished by addition of suitably pressurized fluid to the fluid flowing to the downstream one of those sections. In the case of dissipation or addition of energy respectively by diverting a portion of the fluid stream to exahust and introduction of additional fluid, in accordance with the invention a second regulator is connected to control the rate of flow through the exhaust or addition path. In the case of dissipation of energy by throttling, a variable orifice type of regulator may be connected in the main flow path. More than one such additional regulator may be employed and the controlled fluid condition coupling of any such regulator is so connected with one of the inlet, outlet and/or recovery couplings of another regulator, as to control one of the indicated fluid condition parameters that affects the response characteristic of the first-named regulator.

Again referring to FIG. 1, the solid line 27 indicates a main flow path of fluid from source 21 to output 22, and the solid lines 28, 29 respectively indicate branch paths along which travel energy that affects the energy content level of the fluid delivered at 22. In this case, path 28 is controlled by regulator 23, and may constitute the path of energy dissipated by throttling or by exhaust, or of energy added by introduction of additional fluid from a pressurized source, while path 29 is shown as connected with a region 30 that may be either a high pressure supply or low pressure exhaust, or a region of intermediate pressure so that direction of fluid flow through path 29 may reverse. A definite, repeatable response characteristic is imposed on the system by common control signal responsive mechanism 31 connected to the different control members 25, 26 for proportioning distances of their movements.

Figure 2:
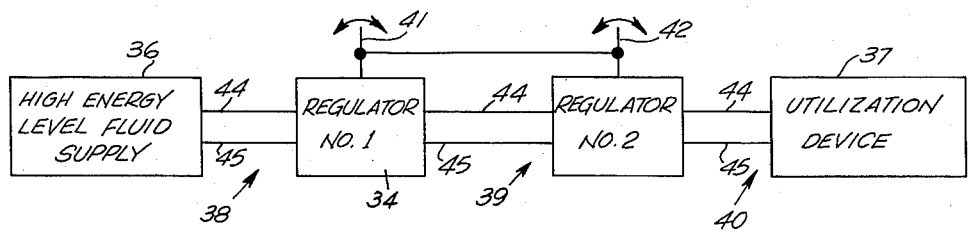
FIG. 2 is a block diagram showing a system including two regulators connected in series, in accordance with the invention.

In FIG. 2, the regulators 34, 35 are connected in series between a supply source 36 and a utilization device 37. In this specific type of system the main energy-delivery or fluid flow path from source 36 to device 37 includes three sections 38, 39, 40 which are defined by regulators 34, 35. At least one of the energy content-determining conditions of fluid, pressure and/or volume flow rate of fluid in the intermediate flow path section 39 is determined by the setting of the control member 41 of regulator 34. Since the response to changes of position of the control member 42 of regulator 35, which response is constituted by a corresponding change in the controlled condition or conditions of fluid flowing in the delivery section 40 of the flow path, is affected by the magnitude of pressure and/or flow rate of fluid flowing in path section 39, the value of the delivered condition will constitute the output of regulator 34, as determined by the setting of its control member 41, modulated by the gain of regulator 35, as determined by the setting of its control member 42. Repeatability and a definite system response characteristic are imposed by a common actuating system 43 that moves the respective regulator control members 41, 42 through distances having a preselected proportional relation. Paths of energy dissipated from or added to fluid flowing from source 36 to device 37 are indicated by lines 44, 45.

Figure 3:
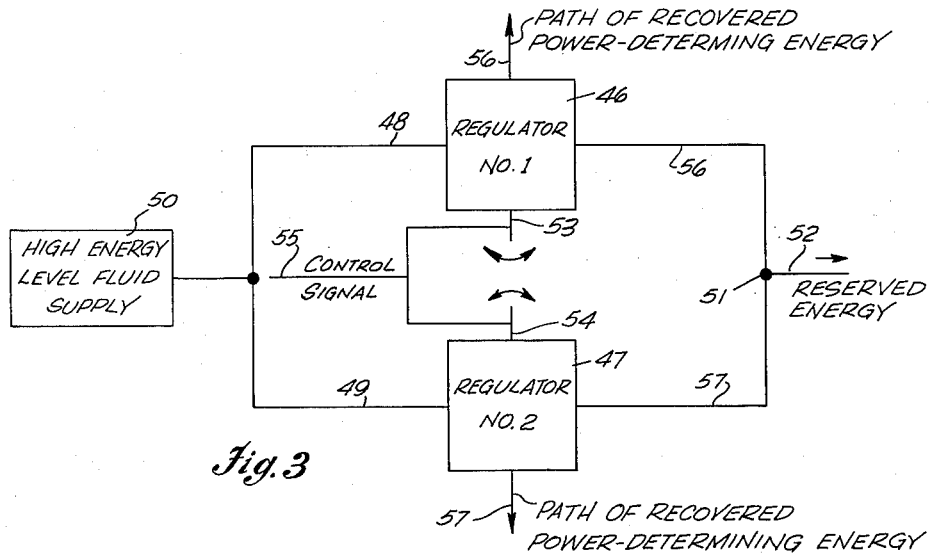
FIG. 3 is a block diagram showing a system including two regulators connected in parallel in accordance with the invention.

FIG. 3 shows a system arrangement according to the invention wherein intermodulation of the gains of two regulators is accomplished by connecting the regulators in parallel with their controlled fluid condition, or output couplings connected to a common recovery line. In this arrangement a pair of regulators 46, 47 respectively are connected in the different ones of a pair of parallel flow lines 48, 49 extended from a pressurized fluid source 50 to a juncture 51 from which extends a delivery line 52 for connection to a utilization device. The control members 53, 54 are connected to a common positioning system 55 which imposes proportional relationship between distances of their respective movements. Paths wherein travel the energy, either by throttle or exhaust dissipation or by fluid addition, under the control of the diffifferent regulators 46, 47 are indicated by lines 56, 57.

Figure 4:
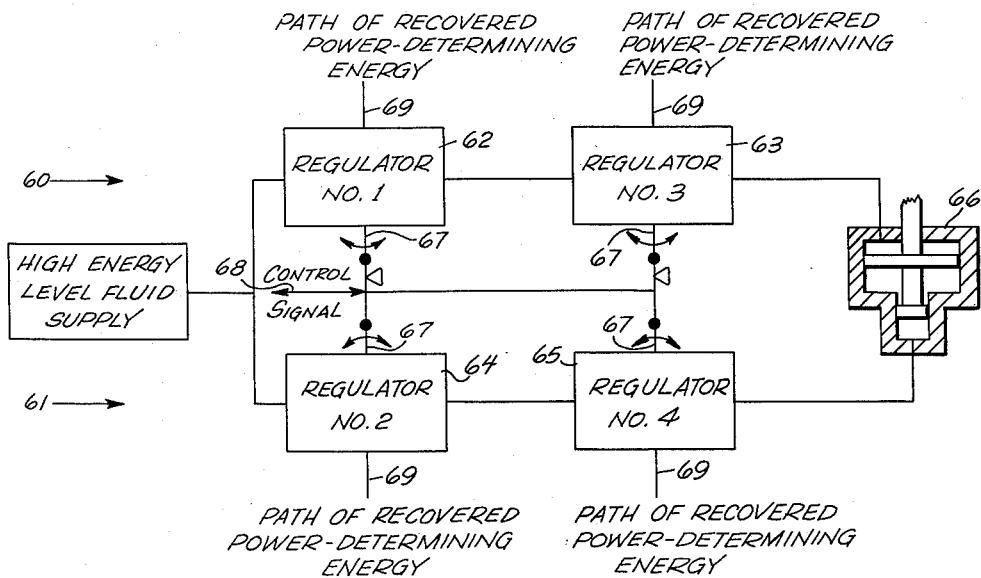
FIG. 4 is a diagram showing a system including a push-pull arrangement of two parallel branches, each including a series connected pair of regulators.

FIG. 4 shows a complex system wherein a pair of fluid condition-regulating flow paths 60, 61 respectively including series connected regulators 62, 63 and series connected regulators 64, 65, are arranged in push-pull fashion for operating a piston and cylinder power unit 66. Each flow path 60 and 61 is arranged as is the single path series system of FIG. 2. The control members 67 of all of the regulators 62, 63, 64, 65 are connected to a common positioning system 68 to impose a preselected, repeatable characteristic on the system. Each regulator is arranged to produce a drop or differential in one or both of the fluid conditions, pressure and/or volume flow rate, of fluid in the sections of the path wherein it is connected and that respectively are upstream and downstream from it, and paths of energy that is added to or dissipated from fluid flowing to power unit 66 are indicated by lines 69.

FIG. 5 schematically and in section shows an actual multiple regulator assembly arranged according to the invention and connected between a source 71 of fluid under pressure and a piston and cylinder assembly 72. Each of the dual regulators of the assembly is of the moving baffle or flapper type. A first such regulator connected to a source 71 has an orifice 74 for discharge to a low pressure exhaust region, a controlled condition or output connection 75, a flow-restriction structure 76 that isolates from source 71 a controlled condition chamber 77 wherein one or both of the fluid conditions, pressure and/or flow rate, is regulated by the position of a baffle 78 that is movable with relation to and variably restricts the area of discharge orifice 74. The second regulator includes an inlet connection 79 that is connected with chamber 77 of the first regulator through output coupling 75, a controlled condition chamber 80 that is isolated from inlet connection 79 by a flow restriction structure 81, a discharge orifice 82 relative to which is movable a baffle 83 for variably restricting its area, and an outlet coupling 84 which constitutes the system output and is connected to power unit 72. For imposing a preselected, repeatable response characteristic on the system, baffles 78, 83 are carried by a common arm 85 which is pivoted for swinging about an axis 86 in response to a control signal transmitted to it by mechanism 87.

It will be appreciated that the proportional relationship between distances of movement of the baffles 78, 83, to vary the modulation of the gain of one of the regulators by the gain of the other, can be accomplished by movement of the pivot axis 86 longitudinally of the swinging support arm 85. In case it is desirable to provide inverse variation of the condition values controlled by the respective regulators the pivot axis may be arranged, as in in FIG. 6, by a pivot structure 88 disposed between a pair of discharge orifice restricting baffles 89, 90 that are carried by an arm 91. As in FIG. 5, baffles 89, 90 respectively control the discharge orifices 92, 93 of a pair of regulators 94, 95 that are arranged as described in connection with FIG. 1.

FIG. 7 shows a complex arrangement comprising a push-pull system wherein each branch includes a pair of series connected regulators 96, 97 and 98, 99 with the output couplings 100, 101 of the respective regulator assemblies connected to opposite service couplings 102, 103 of a piston and cylinder power unit 104. Push pull relationship between the outputs of the regulator pairs 96, 97, and 98, 99 is accomplished by placing a pivot structure 109 between paired baffles 105, 105 and 106, 106 that respectively control the discharge orifices 107, 107 and 108, 108 of the different regulator pairs.

In FIG. 8 is shown a jet pipe 111 mounted for swinging about a fixed pivot axis 112 for variation of degree of regulation between a discharge orifice in its tip 113 and a fixed receiver port 114. A jet of fluid, as oil, or air, is discharged through the jet pipe discharge orifice at high velocity toward the receiver port 114, the fluid being supplied to the jet pipe through a line 115. The volume rate of delivery of fluid through the receiver port 114 is a function of the degree of regulation of the jet pipe discharge orifice with the receiver port and consequently of the angular position of jet pipe 111 about axis 112. A second jet pipe 116 is arranged to swing about a fixed axis 117 for variation of degree of regulation of a discharge orifice in its tip 118 with a fixed receiver port 119. The supply line 120 of the second jet pipe 116 is connected to the receiver port 114 that is associated with the first jet pipe 111.

In FIG. 9 is shown a fixed jet pipe 121 having a jet 121a discharging into a receiver port 122 of a line 123 mounted for swinging about a fixed pivot 124 located more towards the receiver port 122 than towards the line discharge end 125, i.e., distance a from pivot 124 to port 122 is smaller than distance b from pivot 124 to discharge end 125. Again as in FIG. 8, the volume rate of delivery of fluid through the receiver port 122 is a function of the degree of regulation of port 122 with respect to jet line 120, and consequently of the angular position of line 123 about axis 124. On the discharge end 125, a second jet pipe 125a is arranged to swing about fixed axis 124 for varying the degree of regulation of a discharge orifice in tip 125 with a corresponding receiver port 126. According to this embodiment, a small angular displacement between jet 121 and port 122 results in a much larger displacement between jet 125a and port 126.

It is to be observed therefore that the present invention contemplates increase of gain, by parallel relay arrangement with identical outputs and with non-identical individual output or gain characteristics; in series arrangements of relays of the same or different individual gain characteristics to get non-linear output gains and relays in which throttle restrictions of the usual mechanical nature are replaced by sinks, sources or dynamic jet action. In combination with the foregoing, provision is also made for modulation of pressures by energy dissipation, adding of sources or deviation of flow.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

I claim:

1. In a system for transmission of energy by means of a fluid supplied to said system under pressure and for regulating the percentage of fluid energy so delivered that is dissipated and recovered, which said system includes a first regulator having first regulator inlet and outlet flow means, recovery means for connection to a utilization device, and first control means adapted to dissipate a portion of the fluid energy supplied to said first regulator so as to deliver to said recovery means a portion of the supplied fluid energy, said first control means being movable to vary the percentage of energy so delivered and dissipated, said percentage depending upon the magnitude of the fluid energy at one of said first regulator flow means and the position of said first control means; an arrangement providing a preselected functional relationship between a control signal and the magnitude of the energy delivered to said recovery means, said arrangement comprising a second regulator having second regulator inlet and outlet flow means said second regulator inlet flow means being coupled to one of said first regulator flow means, said second regulator outlet flow means being coupled to one of said first regulator flow means, said second regulator outlet flow means being coupled to said recovery means, second control means associated with said second regulator adapted to vary the transmission of fluid energy through one of said second regulator flow means; and, common control means responsive to a control signal for moving said first and second control means through distances corresponding to a preselected relationship.

2. A system as claimed in claim 1, said second regulator inlet means being coupled to said first regulator outlet means.

3. A system as claimed in claim 2, said first control means being a first baffle to regulate the flow rate from an orifice dissipating energy from said first regulator; said second regulator inlet being coupled to the outlet from said first regulator across a flow restrictive structure; a controlled condition chamber in said second regulator isolated by said flow restrictive structure; said second control means being a second baffle associated with said second chamber for variably restricting the discharge from a second orifice in said chamber; said common control means being a pivoted common arm carrying said first and second baffles, said first baffle being located between the pivot point and said second baffle.

4. A system as claimed in claim 2, said first control means being a first baffle to regulate the flow rate from an orifice dissipating energy from said first regulator; said second regulator inlet being coupled to the outlet from said first regulator across a flow restrictive structure; a controlled condition chamber in said second regulator isolated by said flow restrictive structure; said second control means being a second baffle associated with said second chamber for variable restricting the discharge from a second orifice in said chamber; said common control means being a pivoted common arm carrying said first and second baffles, said pivoted common arm pivot point being located midway between said first and second baffles.

5. A system as claimed in claim 2, said first and second regulators each comprising a jet tip discharging into a receiver port, said tips being movable towards and away from a position of maximum discharge into said ports; said first and second control means being so disposed as to move said tips equal distances to and away from said ports in response to actuation by said common control means.

6. A system as claimed in claim 2, said first and second regulators each comprising a jet tip discharging into a receiver port, the port opposed to the discharging jet tip of said first regulator being the inlet of said second regulator, said second regulator being a pivotable flow line starting at one end as said receiver port and terminating at the other end as the second jet tip; a pivot point along said line at a greater distance from one of said line ends than from the other end, dividing said line into two unequal movable control means adapted to displace each of said receiver ports simultaneously to and away from a position of maximum receivable fluid energy with respect to said discharging jet tips, the longer of said unequal movable control means moving its end the greater distance.

7. A system as claimed in claim 1, said second regulator inlet means being coupled to said first regulator inlet means.

8. A system as claimed in claim 7, said recovery means comprising a third regulator interposed between said first regulator and one end of said utilization means, a fourth regulator similarly interposed between said second regulator and the other end of said utilization means, so that said first and third regulator form a branch whereas said second and fourth regulator form another branch of a parallel arrangement; and third and fourth control means also subject to the action of said common control means, said four control means being so arranged and disposed that said first and third control means on the one hand are in push-pull relationship with said second and fourth control means on the other hand so that fluid energy may be first fed at a maximum at one end of said utilization means while at a minimum at the other end of said utilization means, and then by reversing the common control fed at a minimum at said one end and at a maximum at said other end thereby creating a reciprocating movement within said utilization device.

9. A system as claimed in claim 8, including a supply source; two branches to said supply source, the inlet flow means of said first and second regulators being coupled to said branches; said four control members being baffles variably restricting the discharge from orifices in each of said regulators; said common control means being a pivoted common arm carrying said four baffles the pivot point of which is located between the baffles of said first and second regulators, said third and fourth baffles being at opposed ends of said common arm equidistant from said pivot point.

No references cited.